(12) United States Patent
Scholzen

(10) Patent No.: US 8,930,302 B2
(45) Date of Patent: Jan. 6, 2015

(54) APPARATUS AND METHOD FOR IDENTIFYING THE CREATOR OF A WORK OF ART

(76) Inventor: Werner Scholzen, Hilden (DE)

( * ) Notice: Subject to any disclaimer, the term of this patent is extended or adjusted under 35 U.S.C. 154(b) by 15 days.

(21) Appl. No.: 13/321,007

(22) PCT Filed: May 17, 2010

(86) PCT No.: PCT/DE2010/000534
§ 371 (c)(1),
(2), (4) Date: Nov. 17, 2011

(87) PCT Pub. No.: WO2010/133204
PCT Pub. Date: Nov. 25, 2010

(65) Prior Publication Data
US 2012/0072454 A1   Mar. 22, 2012

Related U.S. Application Data

(60) Provisional application No. 61/289,035, filed on Dec. 22, 2009.

(30) Foreign Application Priority Data

May 20, 2009 (DE) .......................... 10 2009 022 147
Jun. 4, 2009 (DE) .......................... 10 2009 023 756
Jun. 4, 2009 (DE) .......................... 10 2009 041 757

(51) Int. Cl.
 *G06F 7/00*      (2006.01)
 *G06F 17/30*     (2006.01)
 *G06K 9/00*      (2006.01)

(52) U.S. Cl.
 CPC ........................ *G06K 9/00* (2013.01)
 USPC .......................................... 707/602; 707/603

(58) Field of Classification Search
None
See application file for complete search history.

(56) References Cited

U.S. PATENT DOCUMENTS

| | | | |
|---|---|---|---|
| 6,017,218 A * | 1/2000 | Bright | 434/84 |
| 8,086,038 B2 * | 12/2011 | Ke et al. | 382/176 |
| 8,144,921 B2 * | 3/2012 | Ke et al. | 382/100 |
| 8,184,155 B2 * | 5/2012 | Ke et al. | 348/142 |
| 2006/0124728 A1 * | 6/2006 | Kotovich et al. | 235/379 |

OTHER PUBLICATIONS

Johnson et al., "Image Processing for Artist Identification", IEEE Signal Processing Magazine, pp. 37-48, Jul. 2008, IEEE.*
Duda et al., "Use of the Hough Transformation to Detect Lines and Curves in Pictures", Communications of the ACM, Graphics and Image Processing, vol. 15, No. 1, pp. 11-15, 1972, ACM.*

(Continued)

*Primary Examiner* — Michael Hicks
(74) *Attorney, Agent, or Firm* — McCormick, Paulding & Huber LLP

(57) ABSTRACT

A method for determining the authorship of a picture, wherein the method comprises at least the following steps: —transferring the picture to be examined or parts of the picture to be examined with the aid of a digitizing means, in particular a scanner, into at least one data set, —analyzing the data set(s) and determining characteristic features or parts of characteristic features, in particular dots or lines or dot or line groups or patterns, contained in the data set in digitized form, wherein the characteristic features to be determined are stored in a database, —and wherein the database includes an additional associated data set for each of the stored characteristic features.

7 Claims, 20 Drawing Sheets

(56) References Cited

OTHER PUBLICATIONS

Sablatnig R et al.,"Hierarchical classification of paintings using face- and brush stroke models", Pattern Recognition and Image Processing Group, Aug. 16, 1998, p. 172-174.

Melzer T et al., "Stroke detection of brush strokes in portrait miniatures using a semi-parametric and a model based approach", Pattern Recognition and Image Processing Group, Aug. 16, 1998, p. 474-476.

Duda R et al., "Pattern Classification, chapter 9: Algorithm-Independent Machine Learning", Pattern Classification, Jan. 1, 2001, p. 453-515.

Lyu S et al., "A digital technique for art authentication",Departments of Computer Science and Mathematics, Dartmouth College, Hanover, NH, Dec. 7, 2004.

Berezhnoy I E et al., "Authentic:Computerized brushstroke analysis", Institute for Knowledge and Agent Technology(IKAT), Maastricht University, Maastricht, The Netherlands, Jul. 6, 2005.

Johnson C R et al., "Image processing for artist identification", IEE Signal Processing Magazine, Jul. 1, 2008, p. 37-48.

First international workshop on image processing for artist identification, Brushwork in the Paintings of Vincent Van Gogh, May 14, 2007.

International Search Report for PCT/DE2010/000534 dated Sep. 27, 2010.

\* cited by examiner

FIG. 2

ND METHOD FOR
APPARATUS AND METHOD FOR IDENTIFYING THE CREATOR OF A WORK OF ART

CROSS REFERENCE TO RELATED APPLICATIONS

This application claims the priority of PCT Application No. PCT/DE2010/000534, filed on May 20, 2009, German Patent Application No. 10 2009 022 147.6 filed on May 20, 2009, German Patent Application No. 10 2009 023 756.9 filed on Jun. 4, 2009, German Patent Application No. 10 2009 041 757.5 filed Jun. 4, 2009, and United States Provisional Patent Application No. 61/289,035 filed on Dec. 22, 2009, the disclosures of which are incorporated herein by reference in their entirety.

FIELD OF THE INVENTION

The present invention relates to an apparatus and method for proving the origin and authorship of pictures.

BACKGROUND OF THE INVENTION

In the world of art, the origin of an artifact, i.e. that each artifact can be assigned to a particular artist, is enormously important, both to determine the actual authorship and to judge the value of an artifact, and also from an art historian's point-of-view. The artist, as the author or creator of the artifact, owns comprehensive rights in and to this artifact that are not lost even after the artifact has been sold off. Furthermore, art historians are also interested in the true origin of a work of art, since in many cases, in particular with older works of art, the artist who created these works of art, can no longer be determined without doubt. This can be due either to a lack or the forgery of a signature, or to the fact that eminent masters had a great number of diligent students whose task it was to finish parts or even whole works of art, which were then still signed by the artists, Rembrandt being an excellent case in point. In these cases, investigative techniques based on the highest technological standard are used to verify the artifacts. It is thus quite frequent to X-ray pictures, and infrared radiation is also often used to identify the water marks of paper mills. Materials irradiated with UV light emit fluorescent light in various colors which may thus be used to identify the material on which the work of art is based. This allows conclusions to be drawn as to the artist in question. Further methods for the identification of forgeries are thermoluminescence analysis, complex chemical analyses or the examination of the work of art under a microscope.

These methods are very complex and expensive, however, and also have to be carried out in suitable locations, usually laboratories, i.e. locations that are designed in such a manner that the radiation does not cause damage to the health of personnel, or rooms with a controlled climate, so that due care is given to maintaining the condition of the picture.

On the other hand, art experts can often determine the authorship of an artifact, in particular a picture, solely with their expert eye. In the course of their training and professional experience they have acquired the ability to recognize an artist as the author of a particular picture. The application of paint, linework and brushwork are some characteristics that are salient for an artist and facilitate identification of his or her works. Brushwork is generally a term used for the linework in painting. It can express the importance of individual areas of the image for the artist in question. For example, the linework of a picture can be finer when it is used for the face, than the linework the artist has used for clothing. This is an indication that the artist is particularly interested in working out the facial expression or the face itself. The brushwork is thus like the artist's personal trademark. Amongst other characteristics, it can also encompass the brushstrokes, the linework, the lightness and the strength of the brush pressure. An artifact, in particular a picture, can be identified with the aid of the artist's, and thus the author's, personal trademark, which then allows the assignment of proper authorship. Currently this is only possible by the personal examination of the picture by a professional's expert eye. For this purpose, the art expert has to study the painting to the smallest detail and has to examine it thoroughly. This process is time consuming and usually very expensive, since art experts are highly qualified professionals.

It is thus the object of the present invention to provide an apparatus and a method which assigns a given picture from a set of likewise predetermined artists to the artist who has created the picture.

SUMMARY OF THE INVENTION

The object is achieved according to the present invention by a method for determining the authorship of a picture, wherein the method comprises at least the following steps:
transferring the picture to be examined or parts of the picture to be examined with the aid of a digitizing means, in particular a scanner, into at least one data set,
analyzing the data set(s) and determining characteristic features or parts of characteristic features, in particular dots or lines or dot or line groups or patterns, contained in the data set in a digitized form, wherein the characteristic features to be determined are stored in a database,
and wherein the database includes an additional associated data set for each of these stored characteristic features.

In this method according to the present invention expert knowledge of art experts is retrieved from a database. It is only a question of the relevant speed of accessing this database and the algorithm used for searching the database, and the size of the data sets to be examined and, of course, also the number of relevant data sets in the database, as to how quickly a result can be presented. Determining characteristic features in the data set for the purposes of the present application, is understood to be the recognition of characteristic features in the data set (and then of course also eventually in the picture to be examined) or the identification (finding) of characteristic features in the data set.

Transferring the picture or parts of the picture into at least one data set with the aid of a digitizing means involves in most cases scanning the painting with the aid of a scanner. It is also possible, however, to use a digital camera instead. This has the advantage that digitizing with the aid of a camera can also be carried out in the field. This is a simple and at the same time quick way, while ensuring high mobility, to obtain the digitized data, in particular without having to transport the artifact, i.e. directly at the location of exhibition. A scanner is another such data acquisition apparatus that scans or measures an object, in particular a picture, in a systematic and regular fashion. Herein, a plurality of individual measurements is used to create an entire image of the object to be scanned or of parts thereof. With three-dimensional artifacts, a 3D-scanner can be used. So-called Cruse scanners, in which the object to be scanned is illuminated with Synchron Light and wherein the reflected light is then focused by means of a lens, can even guarantee absolute orthochromaticity (true colors) and precision of the scanned image with respect to the object to be scanned. For simple drawings, this can be a commercially available scanner, which advantageously has excellent imaging quality (the term "excellent imaging quality" changes over time, since the current new generation of scanners has increasingly better imaging or resolution characteristics). The data sets generated by the scanning process may require large storage capacities, depending on the set resolution, even with small scanned originals. This requirement, however, i.e. the provision of large storage media, can be easily and cost-effectively realized with current storage techniques.

By means of the inventive method the analysis now to be carried out of the data sets obtained by scanning and the determination of the characteristic features, which are of course present in the data set in digital form, is carried out with the aid of sample patterns of the characteristic features stored in the database. These sample patterns are compared with the picture to be examined, to determine whether the sample patterns can be found in the painting to be examined either in identical form or with great similarity.

Determining or identifying these characteristic features, in particular dots or lines or dot or line groups or patterns in the painting to be examined, requires the ability to recognize regularities, repetitions, similarities or patterns in a large amount of data, wherein the recognition of similarities is the potentially most successful strategy. Such a capability can be provided with the aid of the methodologies of pattern recognition. Further characteristic features can be edges, the transition of colors, i.e. the color transition, and the brushstroke itself.

As a rule, the scanned painting to be examined undergoes image analysis, which will be described in the following together with its preparatory steps. This analysis greatly facilitates the subsequent comparison with the patterns present in the database.

After digitizing, the picture or image to be examined is subject to a preparatory step. Amongst other things, this step is used to normalize the picture or image, so that later it can be matched to the patterns to be compared. If necessary, interfering impurities can be suppressed by the use of filters. It is also possible to convert the colors of the image to grey scale if this is useful for the subsequent steps.

Subsequently, the image can be subdivided into segments, allowing homogeneous areas, i.e. areas having, for example, the same texture or the same color, to be combined in a space-saving manner.

This is followed by feature extraction. As a rule, the methods for extracting features are mostly methods which are at best intuitive, or which are based on the long years of professional experience of an expert. Important features can be further processed to feature vectors. Features in the pictures can be straight lines, circular arcs, circles, ellipsoids or other groups that can be geometrically described. The characteristic feature, which can be assigned to the author, can consist of a plurality of these features, or of a single feature.

The features and patterns thus extracted are classified in a further step, i.e. subjected to a classification process. The classification method, also referred to as the classifier, classifies the extracted features and patterns into classes. Classification methods are known from the state of the art. Manual, automatic, numeric and non-numeric statistic and distribution-free, or even dimensioned and learning methods are known. Other methods are also known so that the list given above is not to be interpreted as limiting. In the present case, the classification can be, for example, with the aid of a Bayes classifier. This classifier assigns each feature to exactly one class to which it belongs with the greatest probability.

Actual image analysis can now take place on the basis of this classification, in which image recognition or image interpretation now occurs. In a first step, only what is relevant is visible, and in a second step, the relationship of the features amongst each other is additionally weighted.

The thus recognized and analyzed features are compared with the characteristic features present in the database. If one or even a plurality of matches are found, in addition to the name of the author, an associated data set with further information on the author of the picture can be produced.

In another embodiment of the invention, it is characterized in that the resolution of the digitizing means, preferably a scanner, can be adjusted at will. In this way it is possible to take into consideration both the artifact in question and the amount of data eventually to be processed, which arises from the digitizing operation.

If an artist prefers working in an intricate manner when creating his or her works of art, resulting in thin and perhaps even very light linework, it is necessary to choose a high resolution mode to carry out image analysis so that even the finest and smallest detail can be digitized and subsequently analyzed. In other cases, for example an artifact consisting of a small number of squares of uniform color on a large canvas, the expressive force of the artifact may be high but the information obtained by digitizing the artifact is relatively small and can be completely captured in a small amount of data.

In another preferred embodiment of the invention, the Hough method is used for analyzing and determining the characteristic features in the picture to be examined or in parts of the picture to be examined. The Hough method is based on the eponymous transformation, i.e. the Hough transformation. It is useful to recognize straight lines, ellipsoids and other geometric objects. The characteristic features to be found consist of these objects or are composed of them. Moreover, the Hough method is extremely robust, allowing structures of lines to be identified even in a noisy image, i.e. in an image, in which the geometric objects cannot be recognized in a clear manner. By these means, not only complete lines, but also line segments and other segments and parts of the geometric objects can be determined.

In a further particularly preferred embodiment of the invention, it is characterized in that, in a further step, the method determines reference features of the characteristic features or of parts of the characteristic features contained in the data set, wherein the reference features of the characteristic features are either already stored in the database or are generated in the course of the method. The reference feature of a characteristic feature, in the present application, is generated from the characteristic feature by modifying the same. Only slight deviations between the reference feature and the characteristic feature can be recognized by the human eye. By determining the reference features in the picture to be examined, slight and minor deviations in the characteristic features, which can always occur, can be recognized and thus errors in the authorship assignment can be avoided. Of course, an artist has his or her own characteristic personal trademark, he or she draws or paints particular shapes always in a similar or ideally almost identical manner. However, there are always deviations in the drawn or painted shapes. These deviations must be recognized and, as the case may be, also determined as characteristic features in the picture to be examined. The reference features are generated with the aid of an image processing module. Such image processing modules are known from the state of the art. For example, and not to be interpreted as limiting, individual lines, curves, straight lines, angles or even entire geometric figures are manipulated, wherein the characteristic features or parts of the characteristic features are the starting point for these manipulations.

In a very simple case, the characteristic features or parts of the characteristic features are only enlarged or reduced, whereby there may well be cases where more than one characteristic feature or a part thereof is processed. It is even possible on the one hand to enlarge a part of the characteristic feature and on the other hand to reduce a different part.

In a further preferred embodiment of the present invention, reference features are generated by stretching or compressing the characteristic feature in question or at least part of the characteristic feature. In the present embodiment, in contrast to the above mentioned last embodiment of the invention, the characteristic feature is more strongly defamiliarized. However, such manipulation can also have a positive result, if due to the present image geometry of the picture to be examined, the characteristic feature had made compressing or stretching necessary for the creation of the artifact. Moreover, these manipulations of the characteristic features or parts thereof can mean that one part is compressed while another part is stretched.

In a further preferred embodiment of the present invention, at least one reference feature is generated by changing the curvature of a line.

In another embodiment, the reference feature is generated by changing an angle between at least two lines of the characteristic feature in question.

All these manipulations that are carried out must not change the genuine character of the characteristic feature to an extent that it is no longer suitable for its actual purpose, i.e. the authorship assignment of an artifact. However, other additional manipulations are conceivable over and above the indicated changes in the characteristic features, to generate possible reference features.

Furthermore, it goes without saying that the present inventive method could also be applied only to parts of pictures, i.e. picture extracts. In this case, only parts (extracts) of the pictures that are to be examined, are digitized. This may be the case when a special "characteristic feature" is very prominent, but the viewer is not entirely sure whether this special "characteristic feature" is an original or a forgery to mislead the viewer.

Such a method can be carried out, for example, on an apparatus comprising at least one digitizing means, preferably a scanner, a normalizing module, a segmenting module, a classification module and a database module. Furthermore, at least one storage media and at least one data processing unit are conceivable for such an apparatus.

BRIEF DESCRIPTION OF THE DRAWINGS

FIG. 2 illustrates, in an exemplary explanation, the Hough method with reference to a straight line.

DESCRIPTION OF THE PREFERRED EMBODIMENTS

Figure 1:
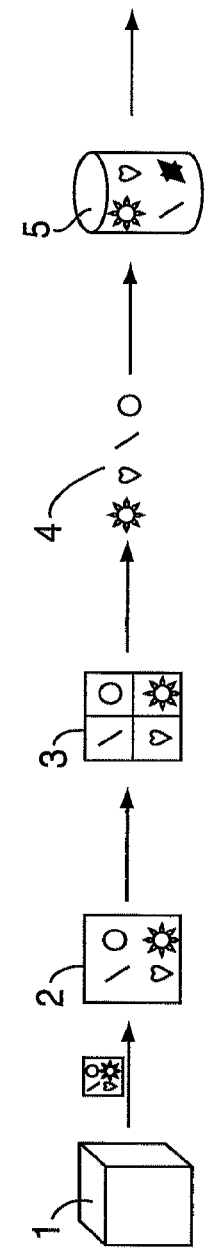
FIG. 1 is a flow chart of the method.

FIG. 1 is a flow chart of the method according to the present invention and of the use of some of the modules necessary therefor. In a first step, the picture to be examined is digitized with the aid of a digitizing means 1, in the present case a high-resolution scanner. The scanned picture is probably a miniature artifact of the highly eminent artist XY, which the latter has painted on the back of an antique matchbox. In the course of time, the artifact has suffered considerably, and also the fact that the matchbox has previously been used according to its original purpose, has not been conducive to the quality of the back side. For this reason, very high resolution has been used. By these means, the individual picture objects, hardly recognizable with the naked eye, have been digitized in such a manner that as little detail as possible has been lost. The high resolution is also used to ensure that potential blemishes, for example, due to dirt on the substrate, can be better recognized and suppressed in the subsequent method. While a large amount of data is generated due to the high resolution, the small size of the picture counterbalances this drawback. Moreover, current technology is entirely capable of efficiently storing and managing large amounts of data. Subsequently, the image is normalized with the aid of a normalizing module 2. This serves to improve comparability of each of the characteristic features found with the patterns present in database 5. Since the patterns present in database 5 are also normalized, at least the size ratios of the individual characteristic features are similar. An artist will always execute the movements that characterize him or her, which manifest themselves in the brushwork, in much the same manner, so that the structure and size of the result of these movements will be similar in most cases.

In the present example, the image is subdivided into segments in the following step. In the present case, this is entirely suitable, since the picture mainly consists of four features, i.e. line, circle, heart and sun. By subdividing the picture into segments in an appropriate manner, which need not necessarily be done in this way, there is exactly one feature for each picture segment. The module, which carries out these steps, is referred to as the segmenting module 3.

The features found are now classified into the classes, in which they belong with the greatest probability, by means of a classifying method, which is carried out in the respective classifying module 4. The line is thus assigned to the class of {lines}, the circle to the class of {circles}. The heart and the sun, however, may not be stored as classes in the database, and are consequently not to be found. There is now a risk that the features are allocated to the wrong class. The heart, for example, can be assigned to the class of {triangles} or the class of {deformed triangles}. However, if the object of the heart is the characteristic feature of the artist to be found, it is also stored in the database in its entirety as a class of {hearts} and in all probability also in the same if wrong class, i.e. the class of {deformed triangles}. This happens because the characteristic features present in the database were also assigned to their classes by classifier 4 as a matter of course, so that in the case of identity or great similarity, classifier 4 usually carries out the same classification. If only parts of the object heart are to be identified as a feature, they are then allocated to the appropriate classes. A heart can be subdivided into ellipsoid segments with an adjacent straight line. The sun can be subdivided, as can be easily understood, into a circle and a number of adjacent triangles. These subdivisions are allocated to their appropriate classes. If the triangles are drawn in a certain characteristic manner, a corresponding pattern will be present in the database, and will invariably be found there.

Database 5 holding patterns of the characteristic features can be any commercially available database. Essential is the provision of an interface to the respective modules, which provide the features to be compared. Database 5 used in the present example includes among other things the following four characteristic features, i.e. line, star, double arrow and heart. The heart from the database is almost identical to the heart which can be found in the picture to be examined. The sun in the picture to be examined has great similarity with the sun found in the database. Since they are not identical, however, an intermediate step is used to further subdivide the object sun (not shown here) into its constituents, which are then compared with the characteristic features of database 5. By these means, the association of the sun in the database with the sun in the picture to be examined can be verified. There is no match for the circle object in database 5. Since all characteristic features found in database 5 indicate the same author, the result for the present example was unequivocal. The artist was indeed the artist XY. The production of result 6 is complemented with further information, also present in database 5, so that the query not only determines the artist but also provides further information on the work and influence of the artist, and outputs this information via an output module, such as a display screen or on paper.

Figure 2:
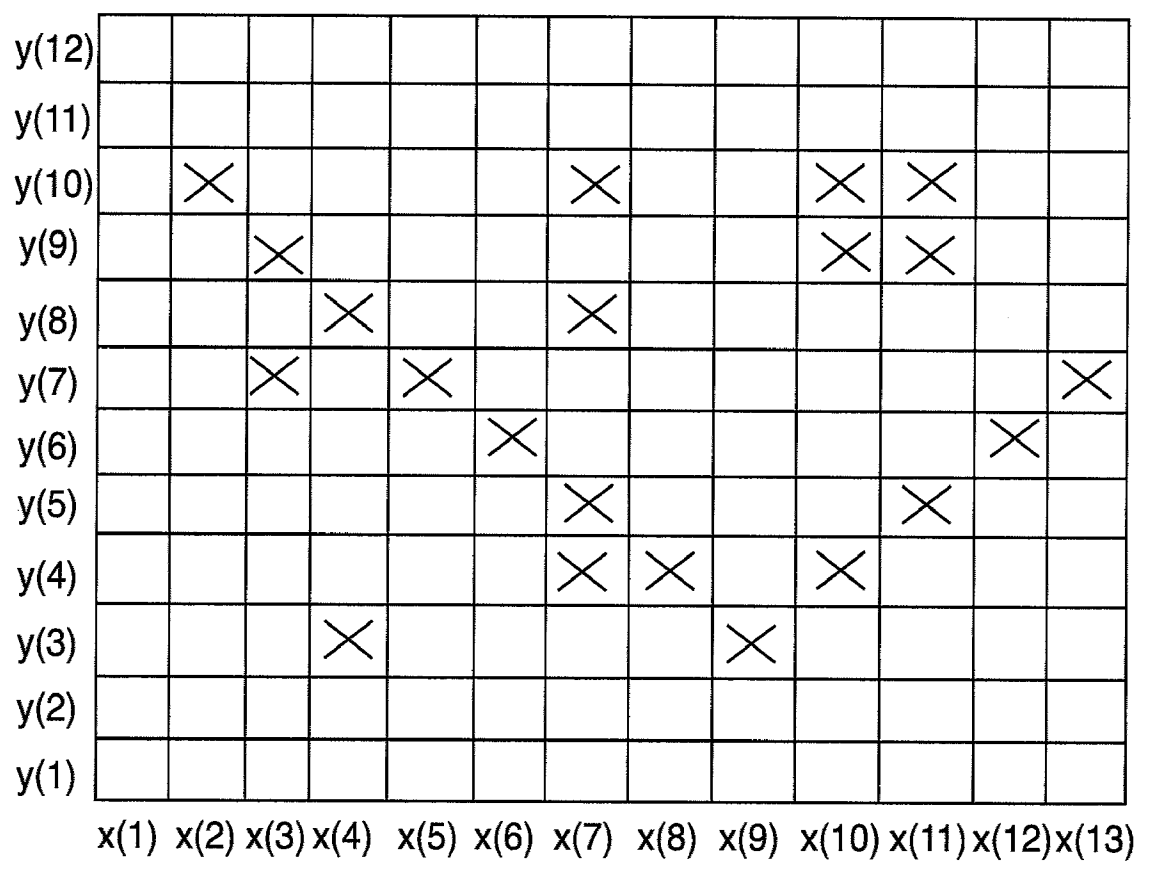

FIG. 2 explains in an exemplary manner the Hough method with reference to a straight line. The empty boxes (pixels) are in one color, such as white, the boxes indicated with an X (pixels) are in a different color, such as black. The human eye now easily recognizes a tick in the present extract, even if the pixels are not all of the same size. A tick can consist of two straight lines in contact with each other. A straight line can be mathematically defined by a vertical distance r from the origin of the coordinate system and angle φ between the corresponding linking line and a coordinate axis. The subdivision of the picture into pixels is a coordinate system suitable for the present purposes, the origin of the coordinate system being in the bottom left corner, the horizontal having the values x(i) and the vertical having the values y(i) (with i as a natural serial number). The extract shown in FIG. 2 has 13 pixels in the horizontal direction, thus has values from 1 to 13, i.e. x(1), x(2), ..., x(13). 12 pixels can be seen in the vertical direction, which is why there are values of 1 to 12 for i, i.e. y(1), y(2), ..., y(12). The straight line easily recognizable for the human eye extends across the pixels having the value pairs {x(2),y(10)}, {x(3),y(9)}, {x(4),y(8)}, {x(5),y(7)}, {x(6),y(6)}, {x(7),y(5)}, {x(8),y(4)}, {x(9),y(3)}, whereupon the straight line veers off in a different direction. Additional pixels are colored in the present extract, i.e. indicated with an X. This straight line can be represented by a series of the value pairs (r, φ). All value combinations (r, φ) are simply checked as to whether or not the pixels present there are all the same color. If this color is different from the color of the surroundings of these pixels, the straight line is visible and represents a straight line in the picture for the viewer. By these means, all straight lines present in the pictures can be found. Other geometric shapes are governed by other mathematical formulae, but can still be found and thus determined with the same method. If the straight line is not only limited to one pixel in width, the adjacent pixels are also recognized as a straight line or as being part of a straight line. This is because two directly adjacent and contacting straight lines are recognized as a broad straight line by a viewer. The greater the number of these straight lines that are adjacent without space, the thicker the straight line that is seen by the viewer as a line in the picture.

Figure 3:
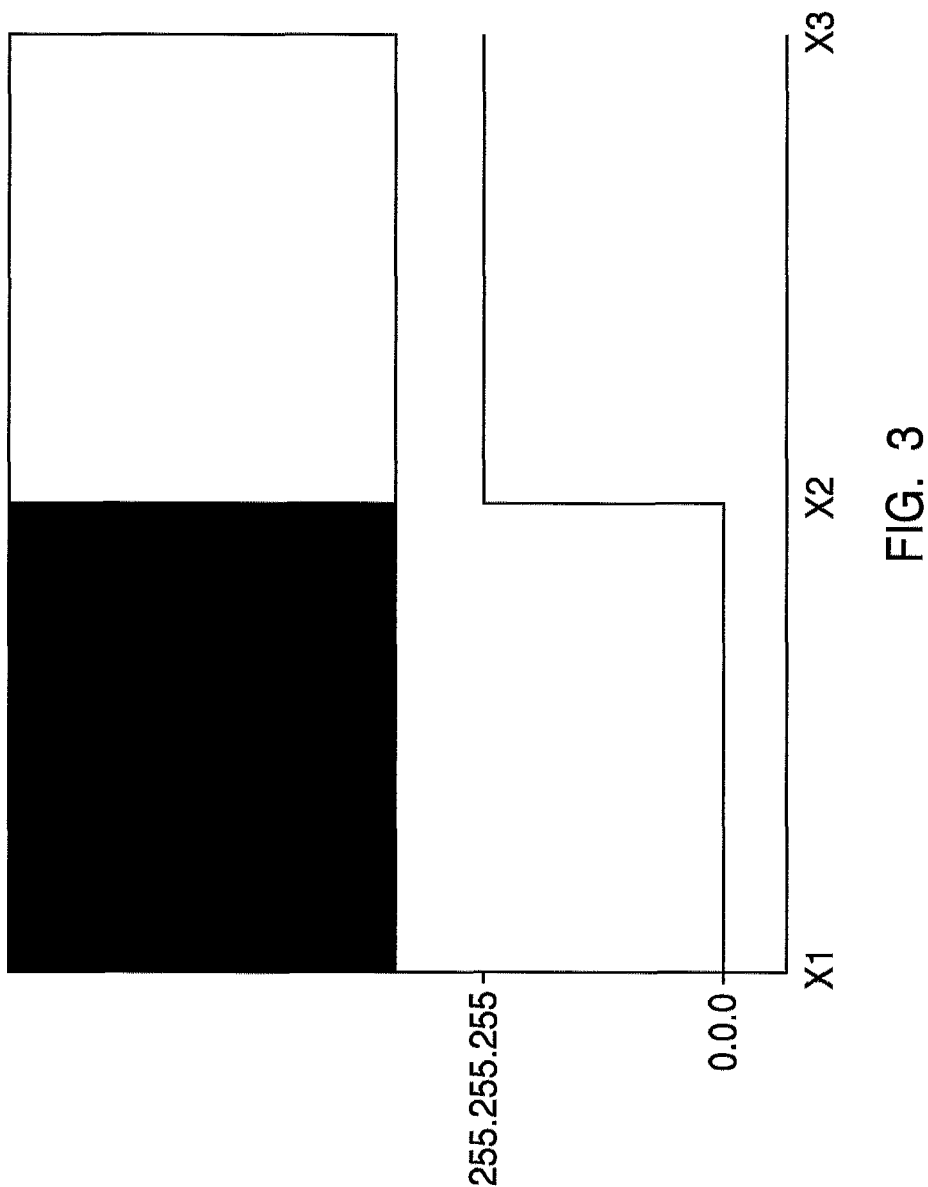
FIG. 3 is a schematic representation of a color edge.

FIG. 3 is a schematic representation of a color edge, wherein the tints white and black each fill an area. The color area in black begins at value x1 and ends at x2, the color edge. The white color area begins at x2 and ends at x3. The development of the values in the RGB color space is also schematically shown below, wherein only the R value (in the RBG number triple indicated in bold) is plotted against the length of the color areas, which are indicated as the values for x. In the RGB color space, the white area has the RGB code (255, 255,255) associated with it, and the black area has the RGB code (0,0,0) associated with it. The curve development is relatively simple. The black color area has the RGB value (0,0,0) over its entire length where, in this area, the curve is constant and continuous. At the color edge, at length value x2, there is a point of discontinuity. In the entire white area, the curve has the RGB value (255,255,255), i.e. is, again, constant and continuous. Such a curve development can be stored as a characteristic feature and thus as a data set in the database. It goes without saying that error tolerances can also be stored in the data set as additional information so that minor deviations of the features in the picture to be examined from the characteristic features stored in the database are recognized.

Figure 4:
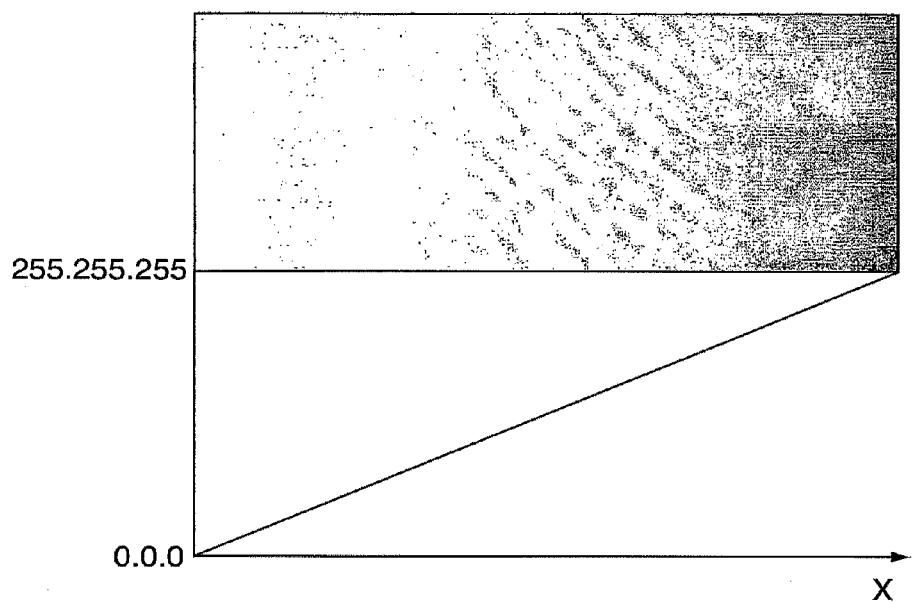
FIG. 4 is a schematic representation of a color transition.

FIG. 4 is a schematic representation of a color transition. The color transition is shown as a transition from white to black as seen from left to right. It continuously progresses through the grey scale. The development of the values in the RGB color space is also schematically shown below, wherein only the R value (in the RGB number triple indicated in bold) plotted along the length X. Again, the RGB value continuously varies in value from (0,0,0) to (255,255,255). In this case, the curve development is a straight line with a linear gradient, according to the formula:

$$R=a*x,$$

wherein a is the gradient of the curve.

Such a curve development can also be stored as a characteristic feature and thus as a data set in the database. It goes without saying that error tolerances can also be included in this case as additional information in the data set, so that minor deviations of the features in the picture to be examined from the characteristic features stored in the database are recognized.

Figure 5:
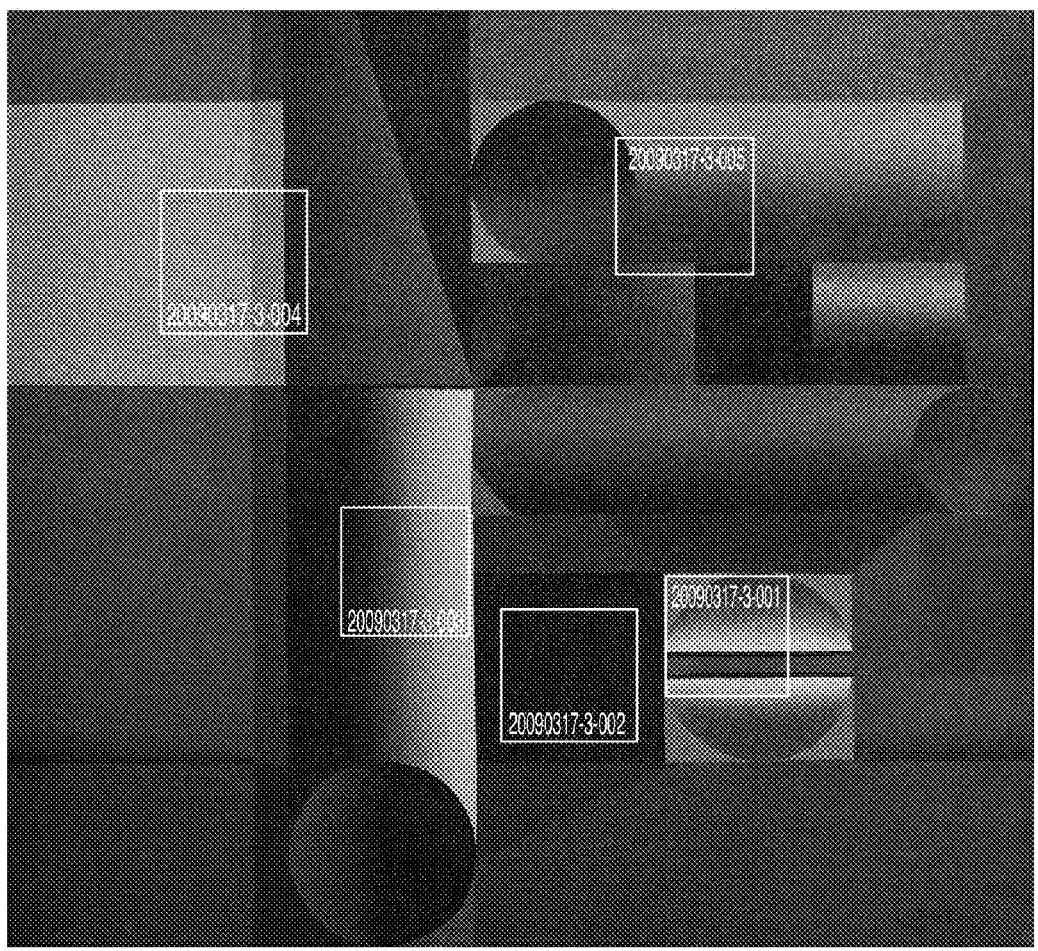
FIG. 5 is a black and white copy of an original with five indicated image areas.
Figure 6:
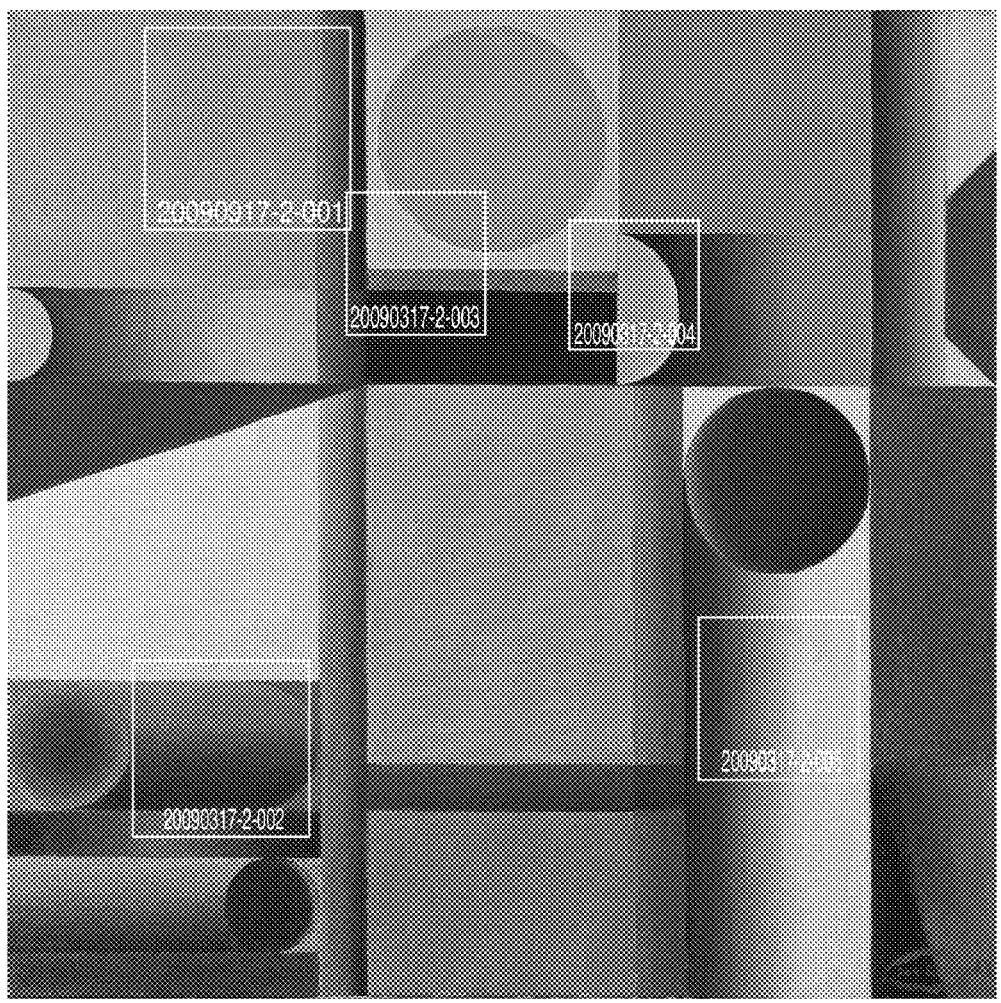
FIG. 6 is a black and white copy of an alleged imitation having five indicated image areas.

FIGS. 5 and 6 show various extracts from three pictures, wherein the difference between the original and the alleged imitation is to be made clear with the aid of an exemplary explanation.

Figure 5A:
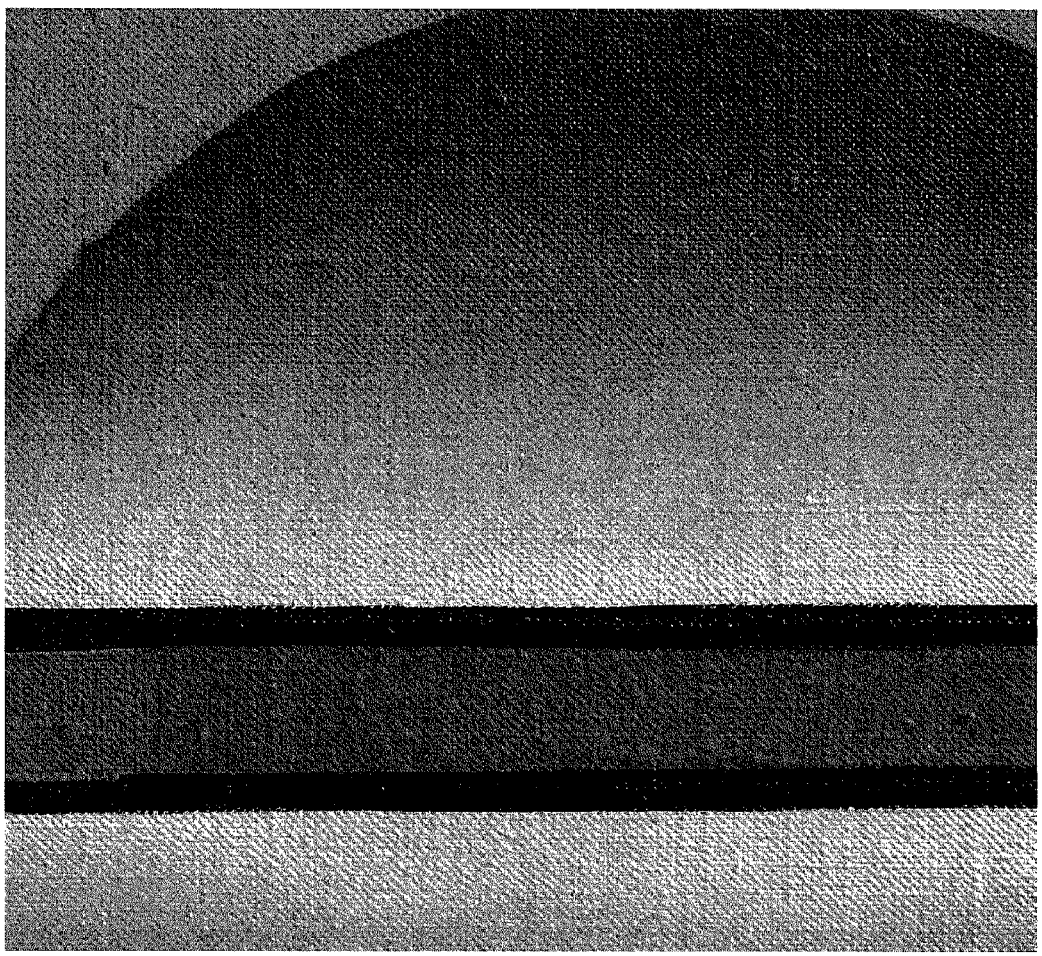
FIGS. 5a to 5e show the indicated image areas of FIG. 5.
Figure 5B:
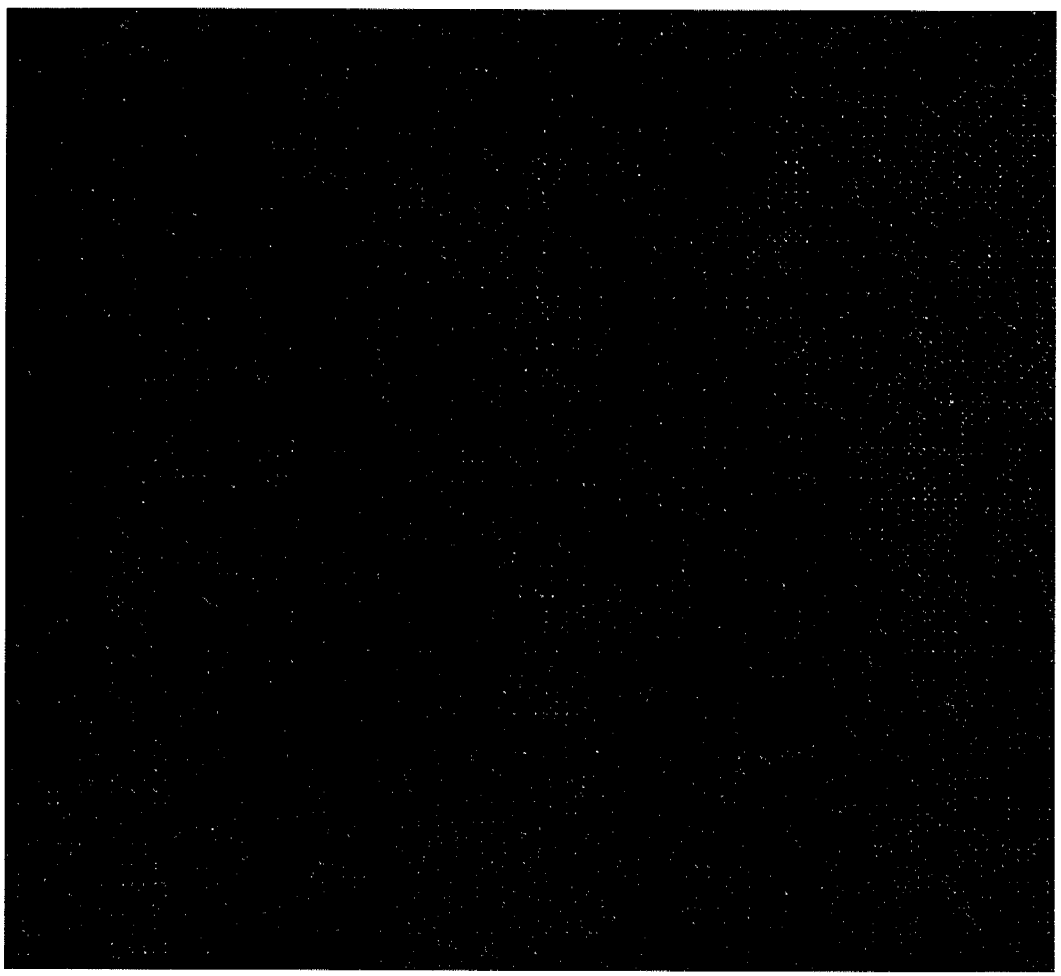
Figure 5C:
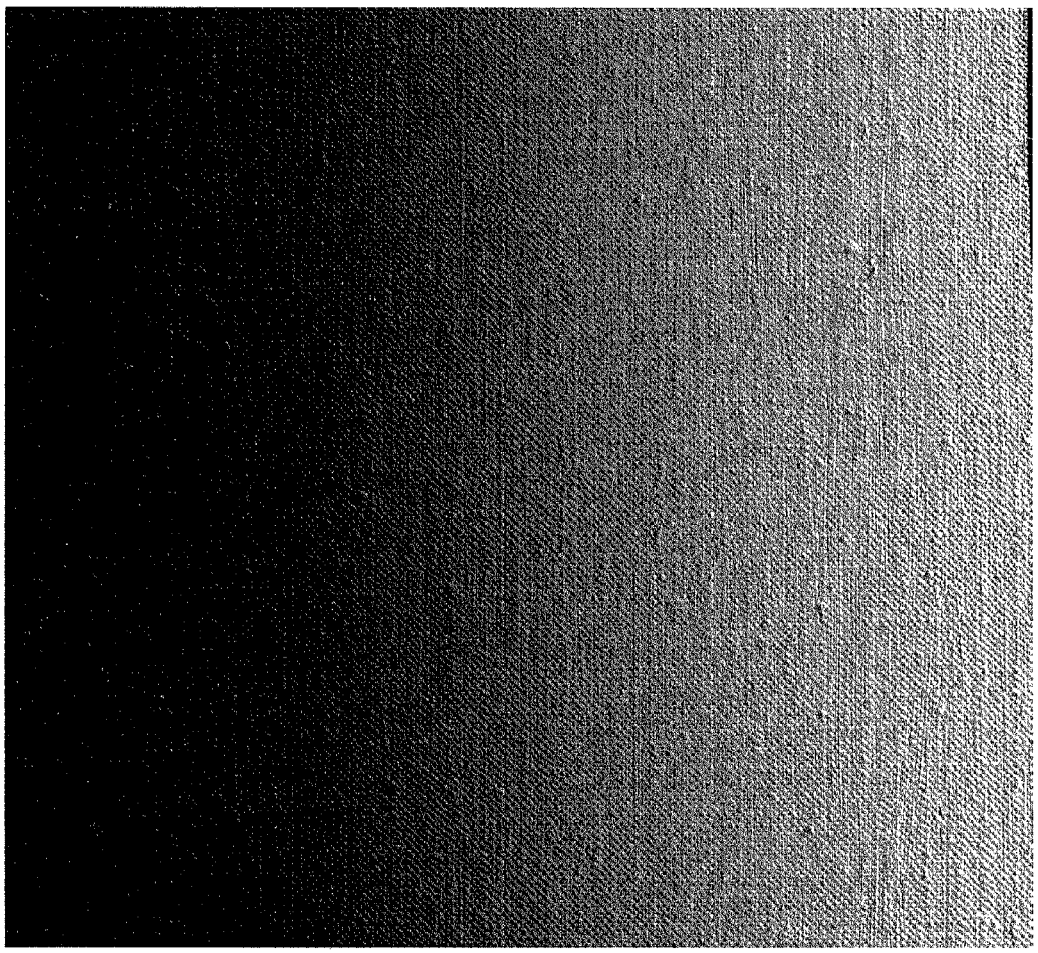
Figure 5D:
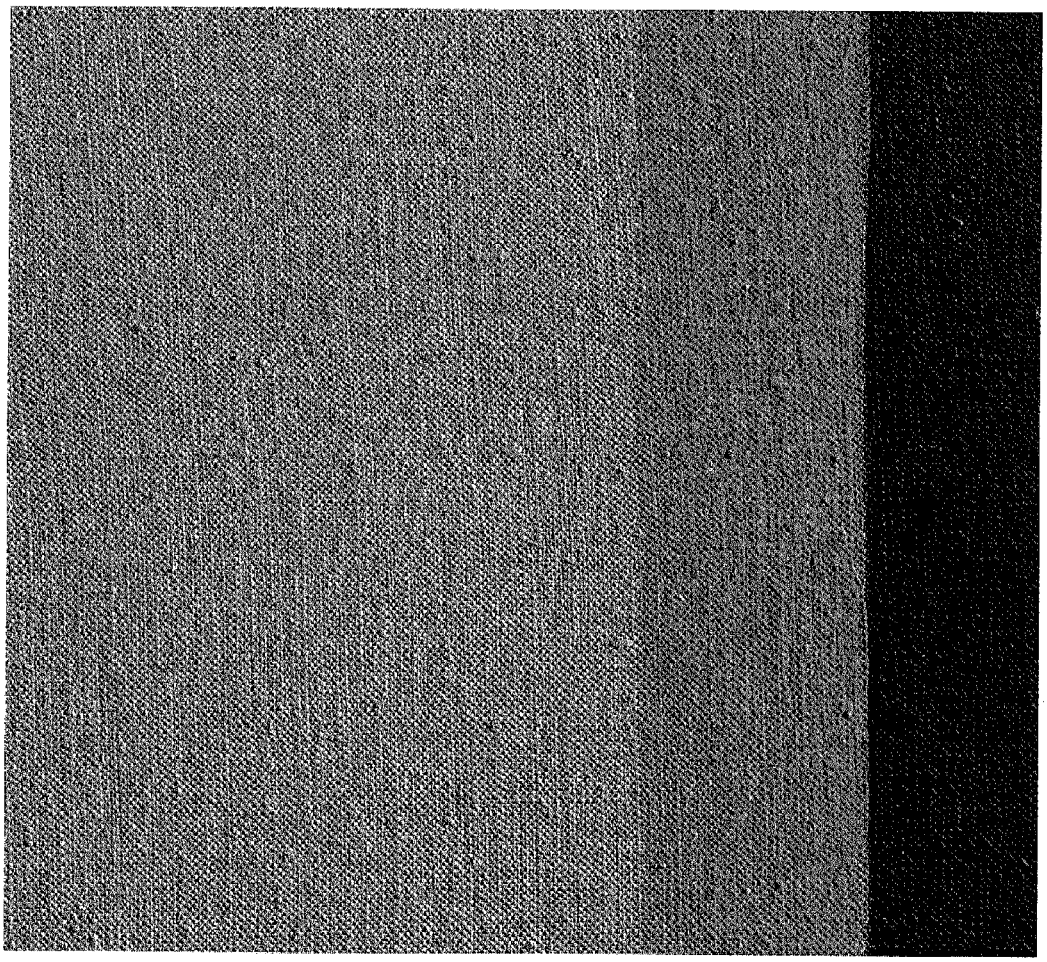
Figure 5E:
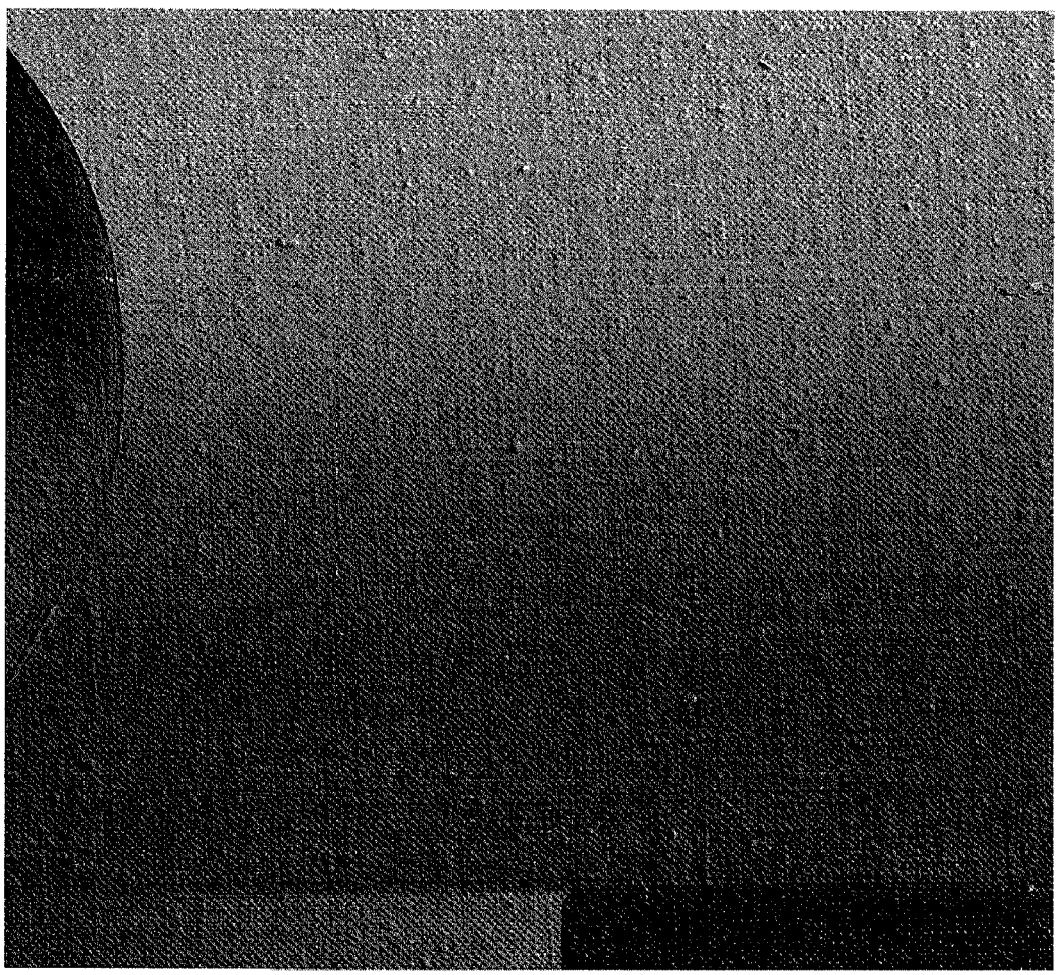

The original picture Stahlrohr (steel tube) painted by Joh. George Müler in 1963 and alleged imitations dealing with the same theme serve to explain the inventive method with reference to a practical example. For this purpose, the original shown in FIG. 5 and certain parts of the original characteristic for this artist, were digitized. In the overall view, five characteristic areas are indicated with white square frames. In addition, each of them has been given a number code in order to guard against confusion. The number codes are:

2009 03 17-3-001, shown in detail in FIG. 5*a*
2009 03 17-3-002, shown in detail in FIG. 5*b*
2009 03 17-3-003, shown in detail in FIG. 5*c*
2009 03 17-3-004, shown in detail in FIG. 5*d*, and
2009 03 17-3-005 shown in detail in FIG. 5*e*

Figure 6A:
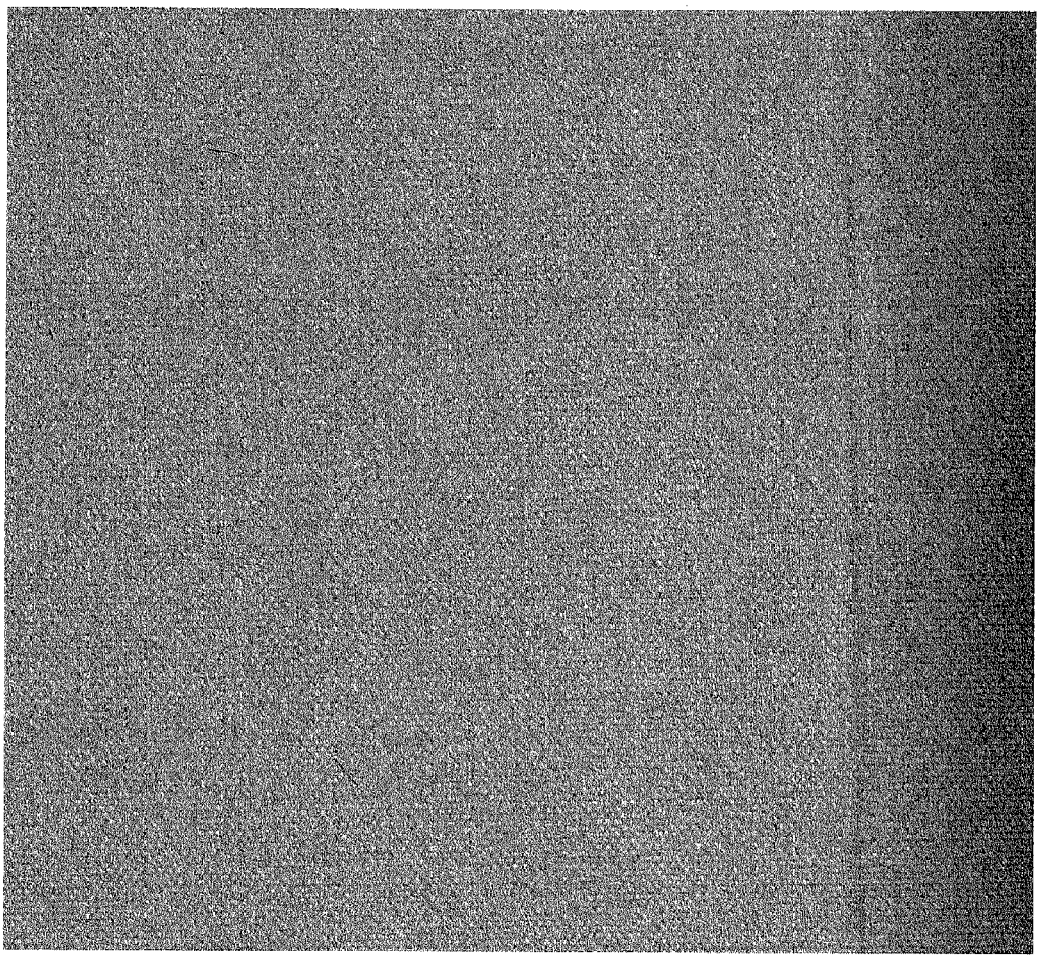
FIGS. 6a to 6e show the indicated image areas of FIG. 6.
Figure 6B:
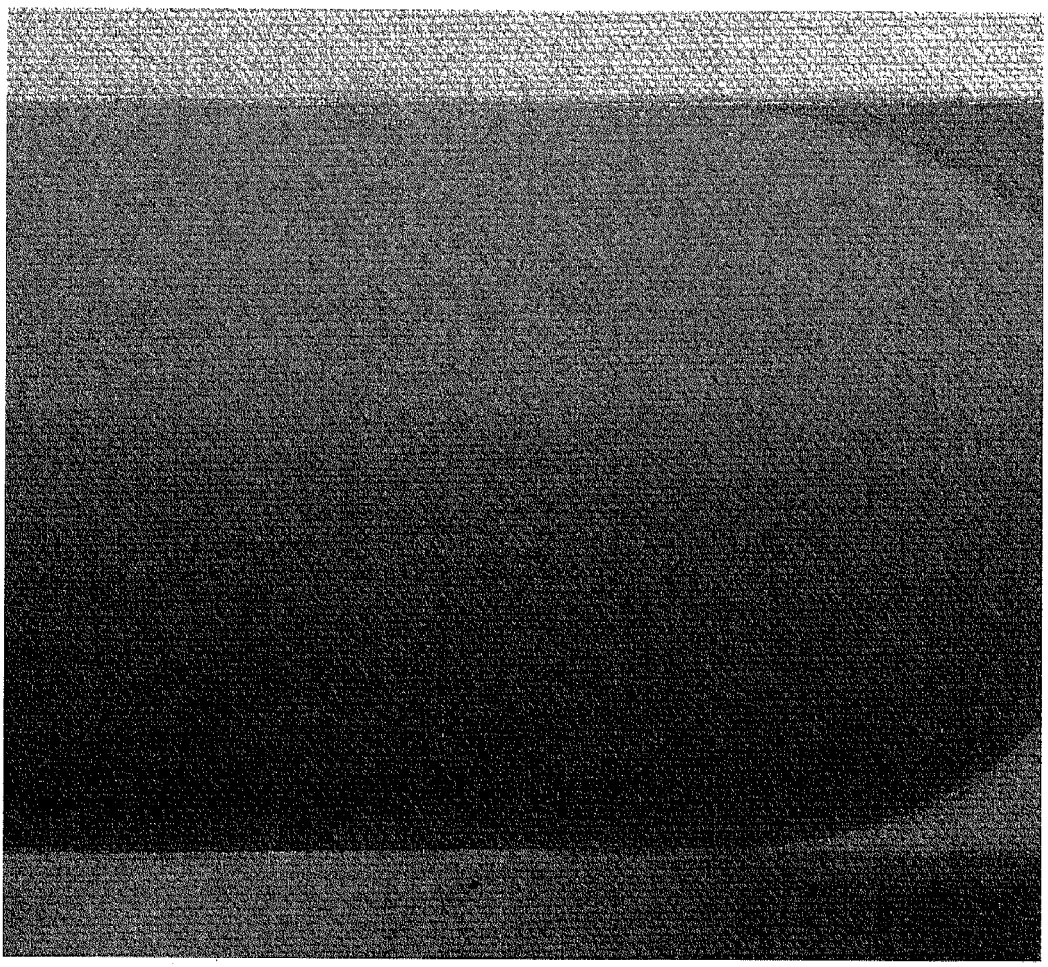
Figure 6C:
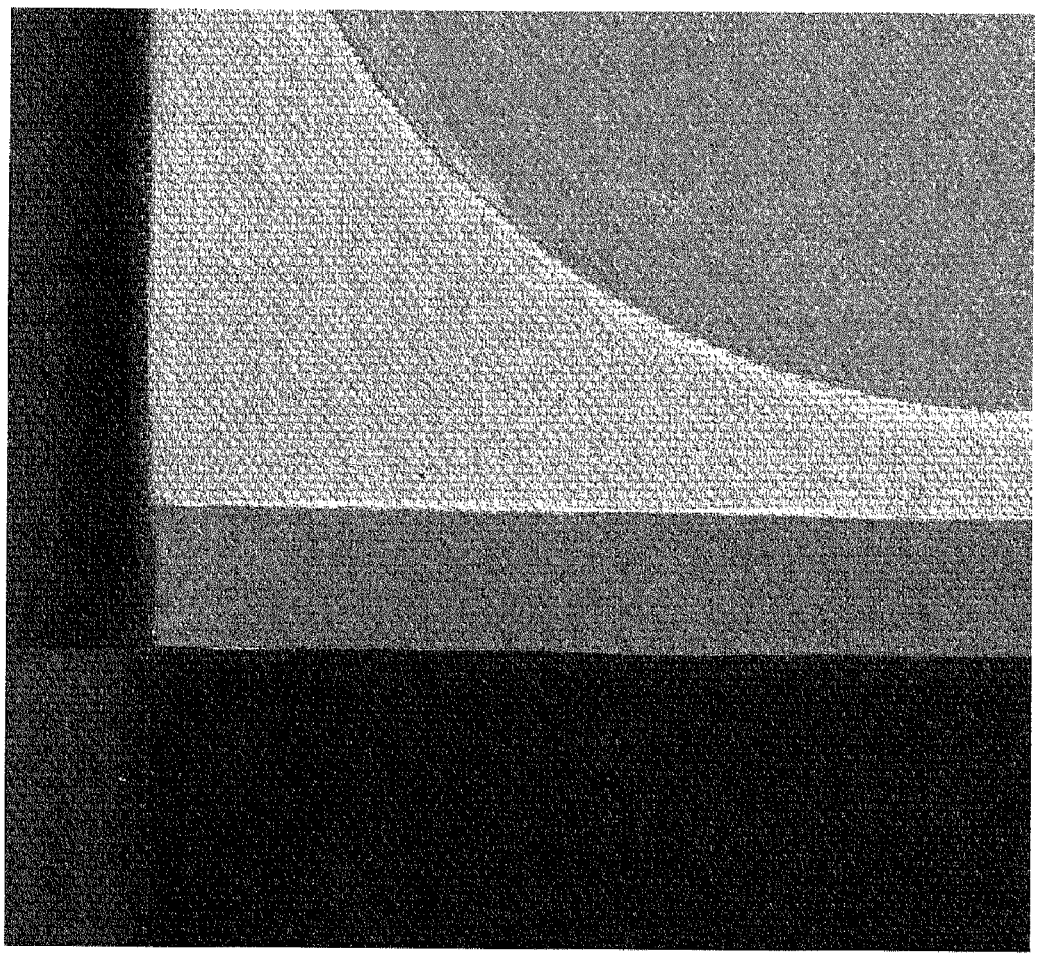
Figure 6D:
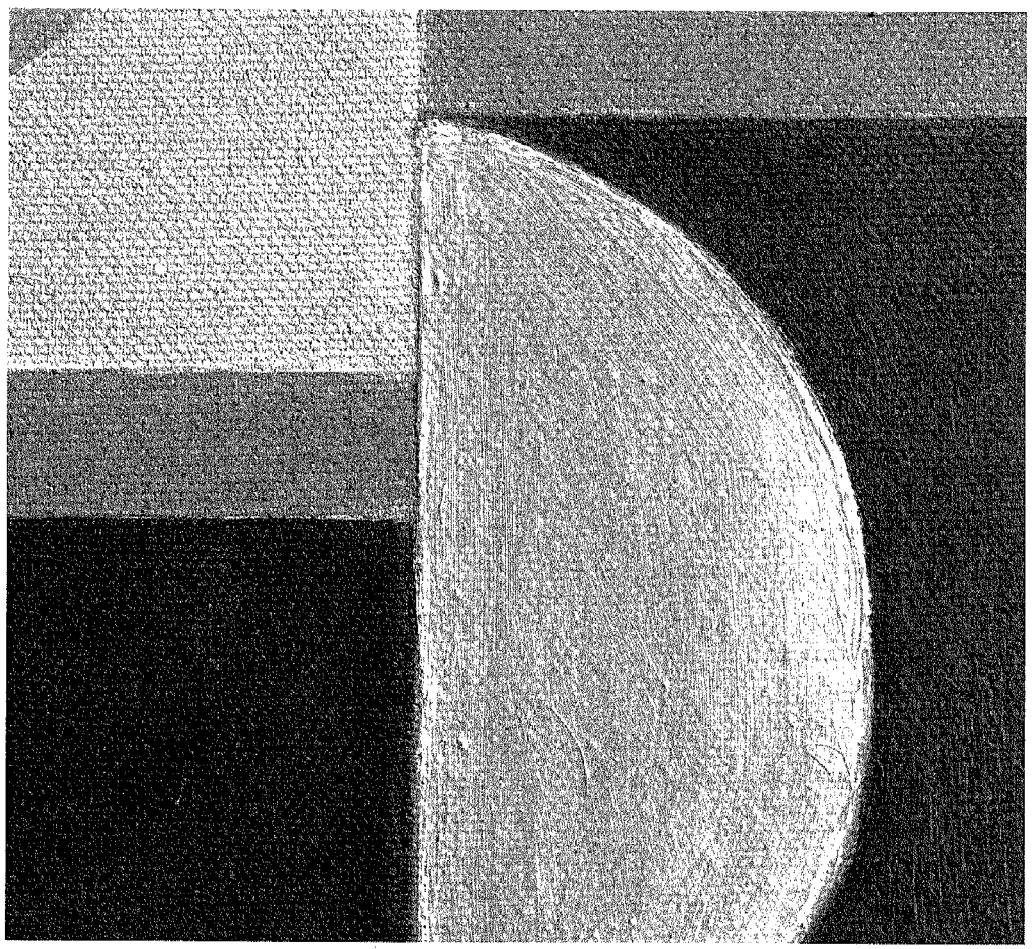
Figure 6E:
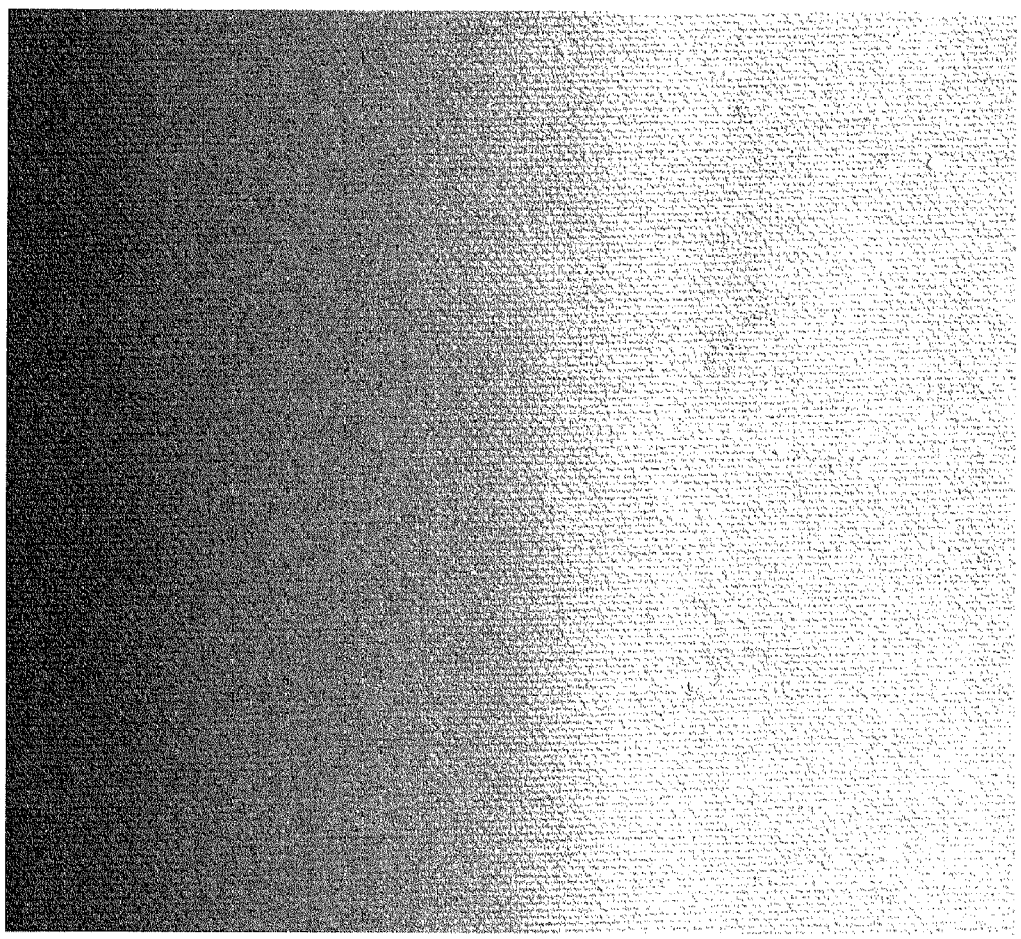

An alleged imitation in FIG. 6 has been treated in the same manner. In FIG. 6, again, five picture areas have been highlighted by square frames. These picture areas have been specifically chosen, however, to be comparable with the characteristic areas of the original picture. The number codes used and the corresponding detailed figures are the following:

2009 03 17-2-001, shown in FIG. 6a
2009 03 17-2-002, shown in FIG. 6b
2009 03 17-2-003, shown in FIG. 6c
2009 03 17-2-004, shown in FIG. 6 and
2009 03 17-2-005 shown in FIG. 6e In FIG. 5, the original picture, the following five picture extracts have been indicated with white square frames:

1. FIG. 5a is a picture extract (identification code 2009 03 17-3-001) in the bottom right quadrant of the original picture, showing a stylized tube in various shades representing the color tints orange, white, grey, violet, black and ochre, and several intermediate shades of these tints. In this picture extract, the color transition from a dark area to a bright area ending in a black horizontal line, is particularly characteristic for the technique of the artist and is thus a characteristic feature which is stored in the database. The color transition from top to bottom continuously changes from a dark tint (black) to a bright tint (yellow-white). To create a color transition with this amount of precision not only requires particular skill and artistic talent, but also a refined technique. Such a continuous transition can be represented in an exact manner by means of a function in the RGB color space, also with a continuous development, and can thus be easily digitized.
2. FIG. 5b shows a picture extract that is entirely black, also in the bottom right quadrant, but left of the first picture extract in FIG. 5a and displaced toward the middle. In this extract, the brushstroke characteristic for the artist is visible, reflected here in the uniform color density. Again, this can be described by means of a mathematical function.
3. FIG. 5c: This picture extract shows another example where the artist has created a color transition. The picture extract is in the bottom left quadrant of the picture in FIG. 5 and shows how shadows play on the surface of a tube. The same applies as for the picture extract shown in FIG. 5a, i.e. that it is easily possible to describe the color transition with the aid of a mathematical function. This function is an approximately linear curve in the three-dimensional RGB space, since all of the RGB values change in a smooth and continuous manner.
4. FIG. 5d: The fourth picture extract is in the top left quadrant of the picture in FIG. 5 and shows the artist's treatment of the color edges separating different color areas. In each place the color areas are separated by a color edge discreetly changing to the tint of each color area. The color areas themselves have the same tint throughout as already shown in FIG. 5b. These features, i.e. uniformly colored picture areas separated by color edges, the tint of which corresponds to the adjacent picture area, is a further characteristic feature of the artist's art of painting.

The RGB value of the first color area and the RGB value of the second color area are constant within each of their respective color areas. However, the RGB value changes abruptly at a color edge. The mathematical function describing this has a discontinuity in this place.

5. FIG. 5e: The fifth picture extract from the top right quadrant of the picture in FIG. 5 shows the shading of a tube and thus illustrates quite clearly the manner in which the artist creates the illusion of shadow play with the aid of a color transition from bright to dark.

These five picture extracts are part of the data sets stored in the database which include several characteristic features of the artist J. G. Müller, namely the structure of a color edge, the structure of the color transition and the brushstroke ensuring a uniform tint throughout a color area. In the present example, therefore, the five picture extracts mentioned above are stored in the database as examples of characteristic features.

FIG. 6 shows a copy of an alleged imitation of an artifact by the artist J. G. Müller, which is to be examined for authenticity. Again, five picture areas are scanned, for example, and then compared with the characteristic features of the artist stored in the database with the aid of the method according to the present invention. It is of course also possible to automate this procedure, either by treating the picture as a whole, or by subdividing it into random segments with the aid of a program. These segments are then examined individually with respect to possible characteristic features with the aid of the present invention.

FIG. 6a shows the first characteristic picture area (2009 03 17-2-001) of the alleged imitation in FIG. 6. When viewing the entire picture, a color edge is recognized by the viewer in the picture area, in various shades representing a yellow color area gradually changing to a yellow-green color area. It emerges, however, that the color edge does not separate the two color areas in the same manner as in the pictures by the artist J. G. Muller. Rather, the edge itself has a darker tint than the adjacent color area wherein the adjacent green color strip in itself does not exhibit uniform coloring. A comparison with the data sets stored in the database does not result in a positive match with the data sets present there. Since in this case, the color edge, as a characteristic feature, separates two color areas which have the same color tint throughout. This cannot be described by a function having the above described selection criteria.

FIG. 6b shows the shadow play on the surface of a tube. This extract is very similar to the one of FIG. 5c, however, the color tints do not change gradually, but rather the transitions are more abrupt. It is quite impossible to describe this as an approximately linear curve in the RGB color space. A characteristic feature can therefore not be found in the database, which could be associated with this picture extract.

FIGS. 6c and 6d show color edges. If the representation shown here is compared to the one in the picture extract of FIG. 5a, it may be easily seen that also in this case the feature of the structure of color edges does not match the feature stored in the database.

FIG. 6e shows a color transition. The same as above applies.

The picture extracts shown above and the comparison of the original with the alleged imitation shows in an impressive manner how the authorship of a picture can be determined or contested with the aid of the inventive method.

Figure 7:
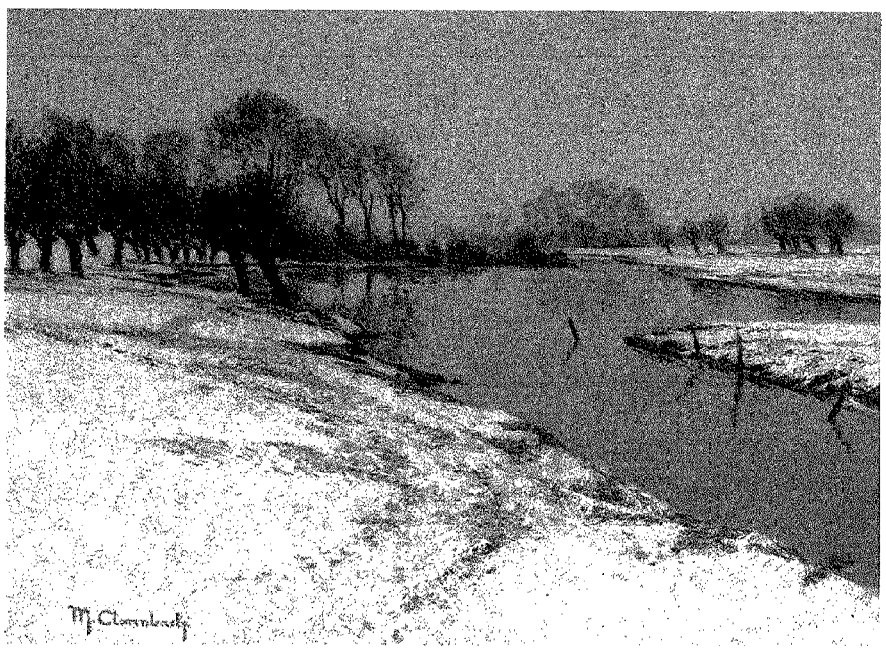
FIG. 7 is a copy of the work by the artist Max Clarenbach.
Figure 7A:
FIG. 7a is an extract of FIG. 7.

FIGS. 7 and 7a show the copy of a work by the artist Max Clarenbach, born in 1880 in Neuss and who died in 1952 in Wittlaer. Max Clarenbach was a German painter and cofounder of the "Sonderbund" in Düsseldorf. His nuanced and subtle way of painting was mainly influenced by the impressionists. The present copy and the associated extract is a landscape showing a river landscape covered in snow. This picture shows in an impressive manner how an artist can be identified with his brushstroke and brushwork. The constantly repeated brushstroke, semicircular in form and full of energy, most probably executed from left to right and thus ending in an accumulation of paint on the left side can be seen clearly here.

Figure 8:
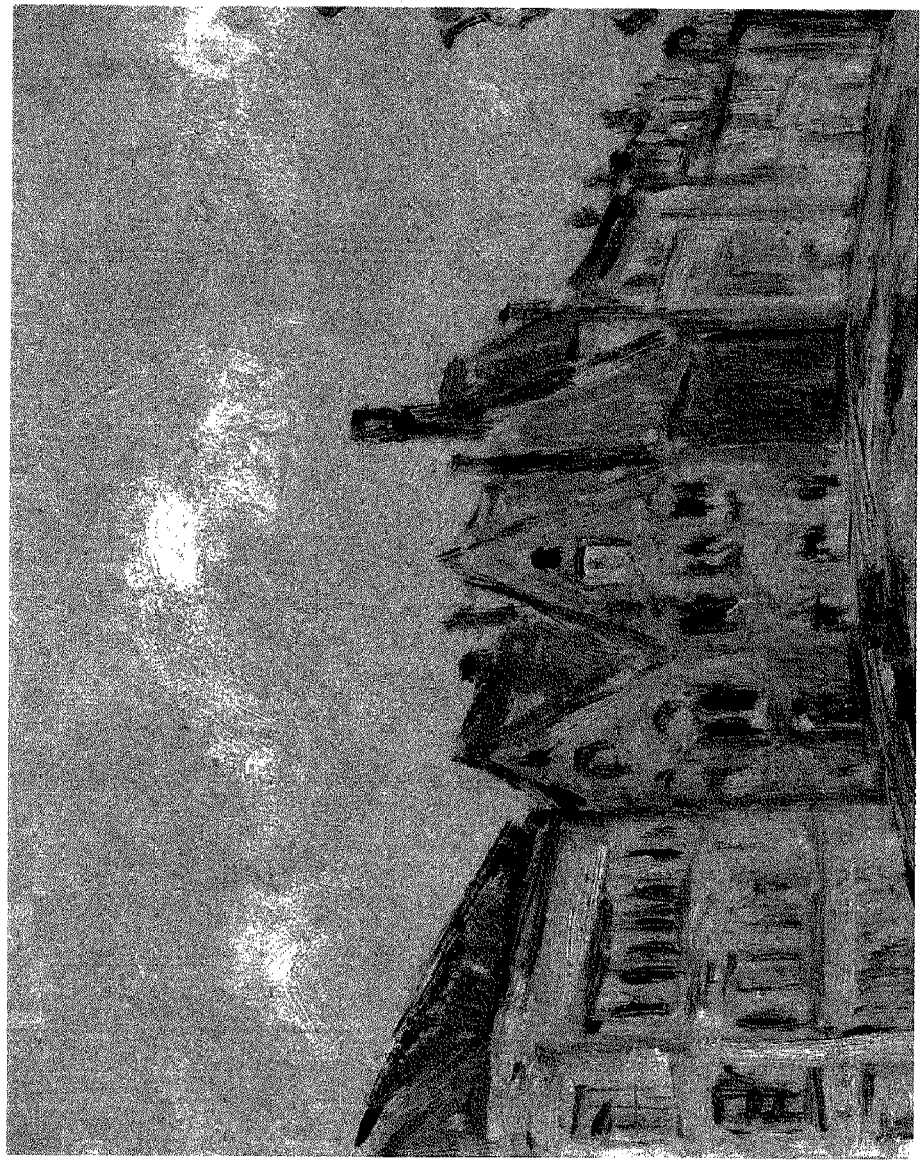
FIG. 8 is a copy of an alleged imitation of the artist M. Clarenbach.

FIG. 8 shows an alleged imitation of the painting technique of the artist M. Clarenbach. If the sky is examined more closely it can be seen without any doubt, that the creator of this picture has executed his brushstrokes in a different manner, i.e. not always from left to right, but also from top to bottom. Also, the individual brushstrokes do not exhibit the characteristic curves and the accumulation of paint created thereby.

Figure 9:
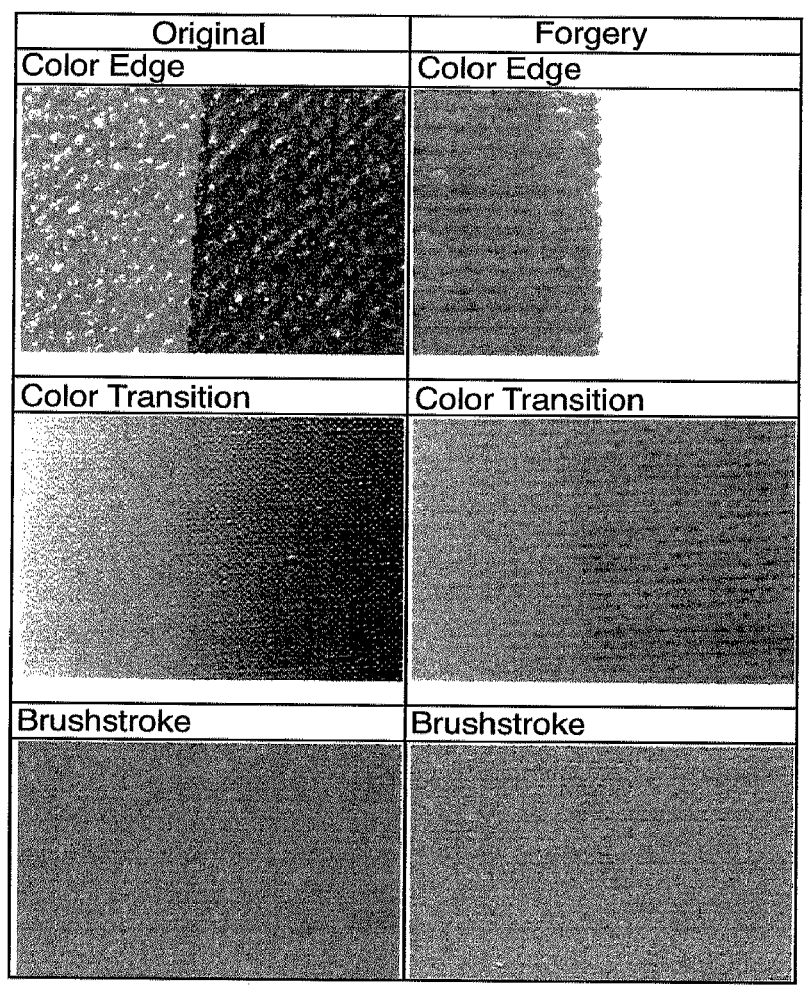
FIG. 9 is a schematic representation of color edge, color transition and brushstroke.

FIG. 9 shows another possible comparison between the possible characteristic features color edge, color transition and brushstroke.

The invention claimed is:

1. A method for determining the authorship of a picture, wherein the method comprises at least the following steps:
   storing in a database known characteristic features of the works of an artist;
   generating from a known characteristic feature of an artist, or a portion of the characteristic features, reference features as modifications of the characteristic features, the reference features representing deviations from the characteristic features;
   transferring the picture to be examined or parts of the picture to be examined with the aid of a digitizing means, into at least one data set,
   analyzing the data set(s) and determining characteristic features or parts of characteristic features, in particular dots, lines, dot or line groups, ellipsoids, and other geometric figures, contained in the data set in digitized form, wherein the characteristic features to be determined are stored in the database,
   wherein a Hough transformation is used for analyzing and determining the characteristic features of the picture to be examined or of parts of the picture to be examined,
   and in further step, the method determines reference features of at least one of the characteristic features or of parts of the characteristic features contained in the data set, wherein the reference features of the characteristic features are either already stored in the database or generated in the course of the method; and
   matching the determined characteristic features and reference features with the stored characteristic features and reference features of an artist to determine the authorship of a picture.

2. The method according to claim 1, characterized in that the resolution of the digitizing means is freely adjustable.

3. The method according to claim 1, characterized in that the reference features are generated by manipulating at least one of the characteristic features or a part of the characteristic features.

4. The method according to claim 1, characterized in that at least one reference feature is generated from the characteristic features by means of enlargement or reduction of the characteristic feature in question or at least a part of the characteristic feature.

5. The method according to claim 1, characterized in that at least one reference feature is generated from the characteristic feature by means of stretching or compressing the characteristic feature in question or at least a part of the characteristic feature.

6. The method according to claim 1, characterized in that at least one reference feature is generated from the characteristic features by changing the curvature of a line of the characteristic feature in question or at least a part of a line of the characteristic feature.

7. The method according to claim 1, characterized in that at least one reference feature is generated from the characteristic features by changing an angle between at least two lines of the characteristic feature in question.

* * * * *